(12) United States Patent
Czarnecki

(10) Patent No.: US 8,310,818 B1
(45) Date of Patent: Nov. 13, 2012

(54) TRANSFER SWITCH HOUSING HAVING A REMOVABLE WALL FOR SEGMENTING THE HOUSING INTO A PAIR OF COMPARTMENTS

(75) Inventor: Neil A. Czarnecki, Mt. Pleasant, WI (US)

(73) Assignee: Reliance Controls Corporation, Racine, WI (US)

( * ) Notice: Subject to any disclaimer, the term of this patent is extended or adjusted under 35 U.S.C. 154(b) by 221 days.

(21) Appl. No.: 12/897,354

(22) Filed: Oct. 4, 2010

(51) Int. Cl.
*H02B 1/26* (2006.01)

(52) U.S. Cl. ........ 361/622; 361/626; 361/641; 361/643; 361/647

(58) Field of Classification Search .................. None
See application file for complete search history.

(56) References Cited

U.S. PATENT DOCUMENTS

| | | | |
|---|---|---|---|
| 5,369,548 A * | 11/1994 | Combs | 361/643 |
| 5,640,295 A * | 6/1997 | Harris et al. | 361/644 |
| 5,761,027 A | 6/1998 | Flegel | |
| 6,107,701 A | 8/2000 | Flegel | |
| 6,163,449 A | 12/2000 | Flegel | |
| 6,293,821 B1 | 9/2001 | Flegel | |
| 6,365,990 B2 | 4/2002 | Flegel | |
| 6,414,240 B1 | 7/2002 | Flegel | |
| 6,504,268 B1 | 1/2003 | Flegel | |
| 7,136,278 B2 * | 11/2006 | Allen | 361/647 |
| 7,405,923 B2 * | 7/2008 | Kelly et al. | 361/644 |
| 7,766,695 B1 | 8/2010 | Czarnecki et al. | |

* cited by examiner

*Primary Examiner* — Boris Chervinsky
(74) *Attorney, Agent, or Firm* — Boyle Fredrickson, S.C.

(57) ABSTRACT

A power transfer device adapted for interconnection with the electrical system of a building includes a cabinet, a set of switches mounted to the cabinet, and wires adapted to connect the switches to an electrical distribution panel associated with a building electrical system. The power transfer device includes a first compartment and a second compartment partitioned from one another by a removable intermediate wall that slidably engages a base that defines a back wall of the cabinet. A first panel closes the first compartment and a second panel is adapted to selectively close the second compartment. The lower compartment provides an interior cavity in which electrical connection between a set of lead wires, connected to the switches, and power input wires can be made.

17 Claims, 8 Drawing Sheets

TRANSFER SWITCH HOUSING HAVING A REMOVABLE WALL FOR SEGMENTING THE HOUSING INTO A PAIR OF COMPARTMENTS

BACKGROUND AND SUMMARY OF THE INVENTION

This invention relates to a power supply arrangement for providing auxiliary power to the electrical system of a building, such as from a standby generator or the like.

Portable generators are used in certain situations to supply electrical power to residential and commercial load circuits during a utility power outage. A system for interconnecting the generator with the load center of a building typically includes a power inlet box having a receptacle for receiving a plug extending from the generator.

The power inlet box is typically mounted to the exterior of a building, and is adapted for connection to a transfer switching mechanism which establishes an electrical path between the generator and the load center. The transfer switching mechanism typically includes a series of switches and circuit breakers, which are operable to supply power to certain selected circuits of the load center. The circuits of the transfer switching mechanism are wired to selected circuits of the load center, through wiring housed within a conduit extending between the transfer switching mechanism and the load center.

A typical transfer switching mechanism includes a housing provided with a power input receptacle. The remote power inlet box is wired to a power cord connected to a junction box, and the power cord is engageable with the power input receptacle of the transfer switching mechanism so as to provide power to the transfer switching mechanism from the generator. An alternative arrangement is illustrated in Flegel U.S. Pat. No. 5,895,981 issued Apr. 20, 1999, the disclosure of which is hereby incorporated by reference. In the '981 patent, the transfer switching mechanism includes a terminal compartment within which a set of terminals is located. The terminals are wired to the switches of the transfer switching mechanism. A set of power input wires extends from the power inlet box, and into the terminal compartment of the transfer switching mechanism. The ends of the power input wires are connected to the terminals, to establish a direct, non-plug type connection between the power inlet box and the transfer switching mechanism.

U.S. Pat. No. 6,414,240 issued to Flegel on Jul. 2, 2002 describes a power transfer switching mechanism that includes a cabinet defining an internal cavity within which a series of switches are mounted. One or more lead wires are connected to the switches, and define ends which extend into a compartment. The compartment is accessible through an opening associated with the cabinet, and a cover is selectively positionable over the opening to provide or prevent access to the compartment. With the cover removed, the lead wires can be connected to power input wires in a conventional manner, e.g., using wire-to-wire connectors, and the wires and the connectors may then be placed within the compartment and concealed by attaching the cover to the cabinet.

The present invention provides a power transfer switching mechanism that improves upon the advancements to the art provided by the '240 patent to Flegel. More particularly, in accordance with one embodiment of the present invention, a power transfer switching mechanism includes housing having a base defining an internal cavity that is segmented into first and second compartments, which may be in the form of upper and lower compartments, by an intermediate and removable wall member. The base is generally defined by a back wall and a pair of sidewalls extending outwardly from the back wall, and which may be integrally formed with the back wall. A mating engagement arrangement is interposed between the base and the intermediate wall member. The mating engagement arrangement may be in the form of a channel formed along the inner surface of the back wall and along facing inner surfaces of the sidewalls, and functions to partition the base into first and second sections, which may be an upper section and a lower section. The intermediate wall member has an opening that defines a passageway between the first and second sections for passing wires between the first and second sections.

The housing includes an enclosure arrangement that is engaged with the base and the intermediate wall member, which is configured to enclose the interior of the housing. In one embodiment, the enclosure arrangement includes a first (or upper) panel that engages portions of the sidewalls and the intermediate wall member, and that is configured to fit over the first section to define the first or upper compartment. In a similar fashion, the enclosure arrangement includes a second (or lower) panel that engages portions of the sidewalls and the intermediate wall member, and that is configured to fit over the second or lower section to define the second or lower compartment. The panels may have end wall portions that, in one embodiment, define a top and bottom of the housing when engaged with the base.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
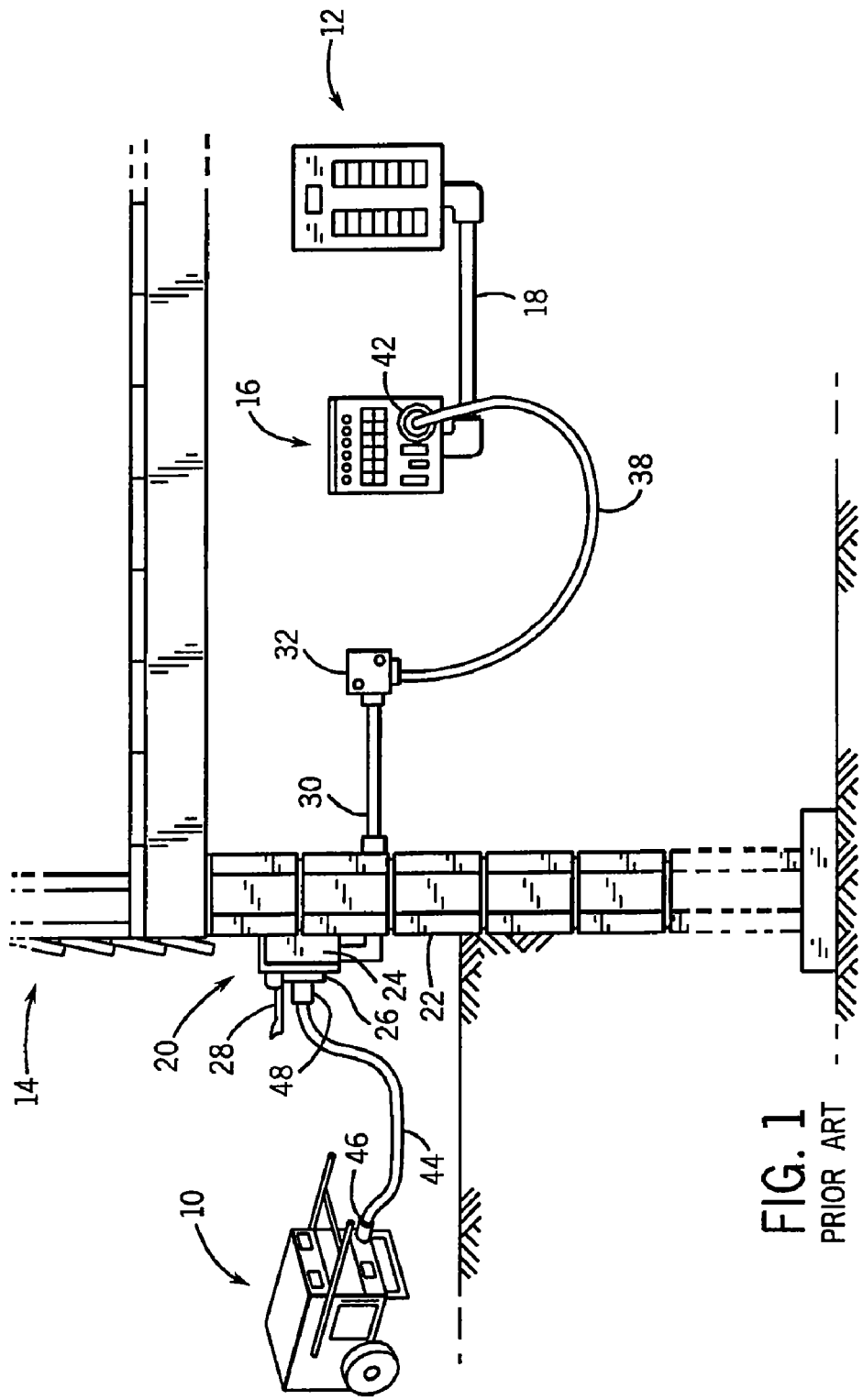
FIG. 1 is a schematic representation showing a prior art transfer switch arrangement for interconnecting an auxiliary power source, such as a portable generator, with a load center or electrical panel associated with a building.
Figure 2:
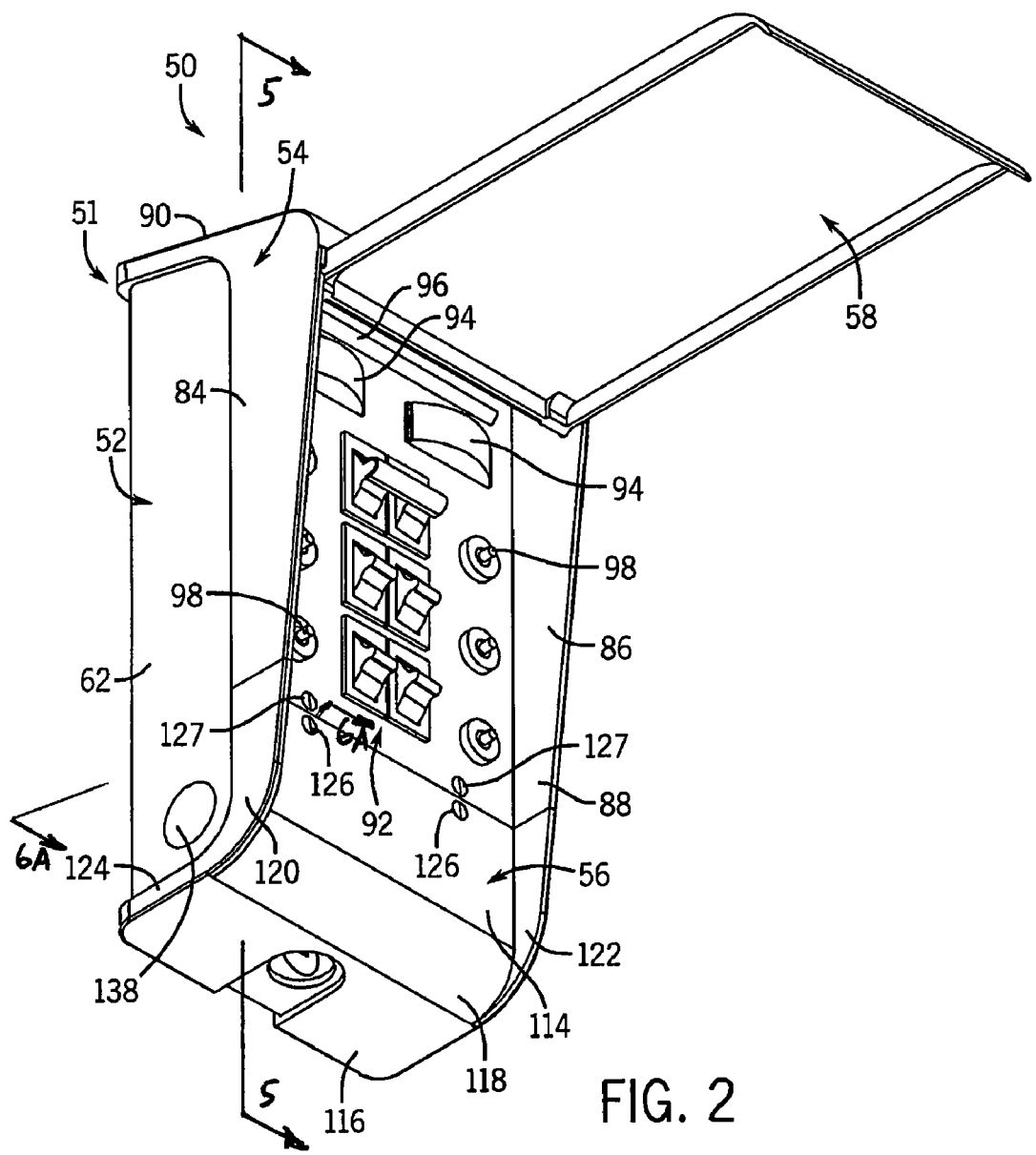
FIG. 2 is a front isometric view of a power transfer device incorporating a housing constructed according to the present invention, adapted for connection in an auxiliary power supply arrangement for transferring power from an auxiliary power source to the load center of a building, and shown with a cover mounted to the housing of the power transfer device in a raised position.

FIG. 1 shows a prior art power inlet arrangement for interconnecting a portable generator 10 with a main electrical panel or load center 12 located in the interior of a building 14. In the prior art power inlet arrangement of FIG. 1, a manual power transfer panel 16 is mounted adjacent main panel 12, and is interconnected therewith via a series of wires enclosed by a conduit 18 extending between main panel 12 and transfer panel 16. Transfer panel 16 may illustratively be a panel such as that manufactured by Reliance Controls Corporation of Racine, Wis.

A power inlet box 20 is mounted to the wall of building 14, shown at 22. Power inlet box 20 includes an external housing including a series of walls such as 24, and a receptacle 26 mounted to a front wall of the housing. A cover 28 is mounted to the front wall of the housing via a hinge structure, and is movable between an open position as shown in FIG. 1 and a closed position in which cover 28 encloses receptacle 26 when not in use. A conduit 30 extends between inlet box 20 and a junction box 32, and a flexible cord 38 is attached at one end to junction box 32. At its opposite end, flexible cord 38 has a connector 42 engageable with a power inlet receptacle provided on transfer panel 16. Appropriate wiring and connections are contained within inlet box 20, conduit 30 and junction box 32 for providing an electrical path between inlet box 20 and transfer panel 16 when cord 38 is engaged with the inlet receptacle of transfer panel 16.

A power cord 44 extends between generator 10 and power inlet box 20. Cord 44 includes a plug 46 at one end, which is engageable with the power outlet of generator 10. Cord 44 further includes a connector 48 at the end opposite plug 46. Connector 48 is engageable with receptacle 26 for transferring power generated by generator 10 to power inlet box 20, which is then supplied through the wiring in conduit 30, junction box 32, cord 38 and connector 42 to transfer panel 16, and from transfer panel 16 through the wiring in conduit 18 to main panel 12. In this manner, generator 10 functions to provide power to selected circuits of main panel 12 during a power outage. In this arrangement, the user first connects cord 38 to the power input of transfer panel 16 utilizing connector 42, and then exits the building, connects cord 44 between generator 10 and power inlet 20, and then commences operation of generator 10.

The present invention provides a housing for a power transfer switching mechanism having the same function as in the prior art power transfer arrangement of FIG. 1.

Turning now to FIGS. 2-5, a power transfer switching mechanism 50 according to one embodiment of the present invention includes a housing 51 defined by base 52, a first, or upper, panel 54, a second, or lower panel 56, and a cover 58. The base and the first and second panels collectively define an interior volume that can be further compartmentalized, as described further herein. The base 52 is defined by a back wall 60, a pair of sidewalls 62, 64 and a lower wall 66, which in one embodiment are integrally formed as a single unitary structure. A hanging tab 68 extends from an upper end of the back wall 60 for mounting the power transfer switching mechanism 50 to a wall (not shown) or other mounting structure.

The construction of the back wall 60 and the sidewalls 62, 64 forms a series of planar surfaces that provide a seat for the first panel 54. More particularly, sidewalls 62, 64 extend outwardly from the back wall 60 generally along a plane that is perpendicular to the plane of the back wall 60. As a result, each sidewall 62, 64 has a first outer edge 68, 70, respectively, and a second outer edge 72, 74, respectively. The second outer edges 72, 74 may be generally perpendicular to the first outer edges 68, 70, respectively, or may be formed so as to have an incline from front-to-back. The upper end of the back wall 60 also defines an outer edge 76 that is generally perpendicular to the first outer edges 68, 70. The first outer edges 68, 70 extend along the length of the sidewalls 62, 64, respectively, and therefore run from the upper end of the back wall 60 to the lower wall 66.

An intermediate transverse wall 78 is located within the housing 51 and partitions the interior volume into a first or upper cabinet section or compartment 80 and a second or lower cabinet section or compartment 82. While the construction of the back wall 60 and the intermediate wall 78 is shown and described in connection with intermediate wall 78 separating the interior volume into upper and lower sections or compartments, it is also understood that intermediate wall 78 may be in any other satisfactory orientation as desired in order to form the separate interior sections or compartments. For example, intermediate wall 78 may be oriented vertically so as to form separate side-by-side (left-right) sections or compartments.

The first, or upper, panel 54 is constructed to fit against an upper portion of the base 52 to define the aforementioned upper compartment 80. The first panel 54 has a pair of sidewalls 84, 86 interconnected by a planar face 88. The upper end of the first panel 54 has a generally planar top 90 that extends rearward from the sidewalls 84, 86, and ultimately, fits against the upper end, e.g., edges 72, 74, and 76, of the base 52 when the first panel 54 is secured to the base 52. The front face 88 carries the various electrical components of the power transfer switching mechanism 50, which may include switches 92, meters 94, a light bar 96, and circuit breakers 98. In one embodiment, the switches, meters, light bar, and breakers are mounted to the first panel 54 in a conventional manner before the first panel 54 is secured to the base 52.

The sidewalls 84, 86 of the first panel 54 have respective forward facing surfaces 100, 102 and rearward facing surfaces 104, 106 that are defined by lip portions of the sidewalls 84, 86, respectively, that extend rearwardly past the planar face 88 of the first panel 54. The forward facing surfaces 100, 102 provide a seat for the front cover 58 when the cover 58 is attached to the first panel 54. The rearward facing surfaces 104, 106, however, overlap and abut against the exterior sides of the sidewalls 62, 64 of the base 52. The peripheral edge of the top 90 of the first panel 54 has a lip 108 that extends downwardly from the top 90 along a plane that is generally perpendicular to the plane of the top 90. When the first panel 54 is mounted to the base 52, the upper end of the base 52 sits against the inner surface of the lip 108. In this regard, when the panel 54 is mounted to the base 52, surfaces 72, 74, and 76 abut against the underside of the top 90. The lip 108 and the rearward lip portions of the sidewalls 84, 86 therefore wrap around the respective upper and side portions of the base 52 to provide an overlapping and snug fit of the panel 54 onto the base 52. At its central area, a notch is formed in the lip 108 to accommodate the hanging tab 68.

A pair of spaced apart ribs 110 is formed along the interior surfaces of the back wall 60 and the side walls 62, 64. The ribs 110 collectively define a channel or groove 112 sized to receive the intermediate wall 78. In this regard, the intermediate wall 78 may be slid into the channel 112 to be mounted to the base 52. When mounted into place, the wall 78 effectively partitions the interior volume into the aforedescribed upper and lower cavities or compartments. Alternatively, one of the ribs 100 may be eliminated so that the other rib forms a ledge that supports the intermediate wall 78, or the edges of intermediate wall 78 may be formed with a channel and the back wall 60 and side walls 62, 64 may include mating ribs that are engaged by the channel. It is understood that intermediate wall 78 may be engaged with the back wall 60 and/or the side walls 62, 64 in any other satisfactory manner that maintains intermediate wall 78 in position relative to base 52.

As described above, the lower compartment 82 is defined by the intermediate wall 78 in combination with back wall 60 and the lower portions of the sidewalls 62, 64. This lower compartment 82 is accessible through an opening that is available when second panel 56 is removed. It will thus be appreciated that the second panel 56 is sized so as to enclose the access opening of lower compartment 82.

The second panel 56 has a generally L-shaped configuration that is defined by a generally planar front surface 114, a generally flat or planar bottom surface 116, and a curved surface 118 interconnecting the front and bottom surfaces 114, 116. In one embodiment, the second panel 56 is formed as a single unitary member. The width of the second panel 56 is defined by curvilinear sidewalls 120, 122 that align with sidewalls 84, 86 of the first panel 54 when the housing 51 is assembled. The sidewalls 120, 122 extend past the planar front surface 114 of the second panel 56, to define rearwardly extending lip portions of the sidewalls 120, 122.

Figure 3:
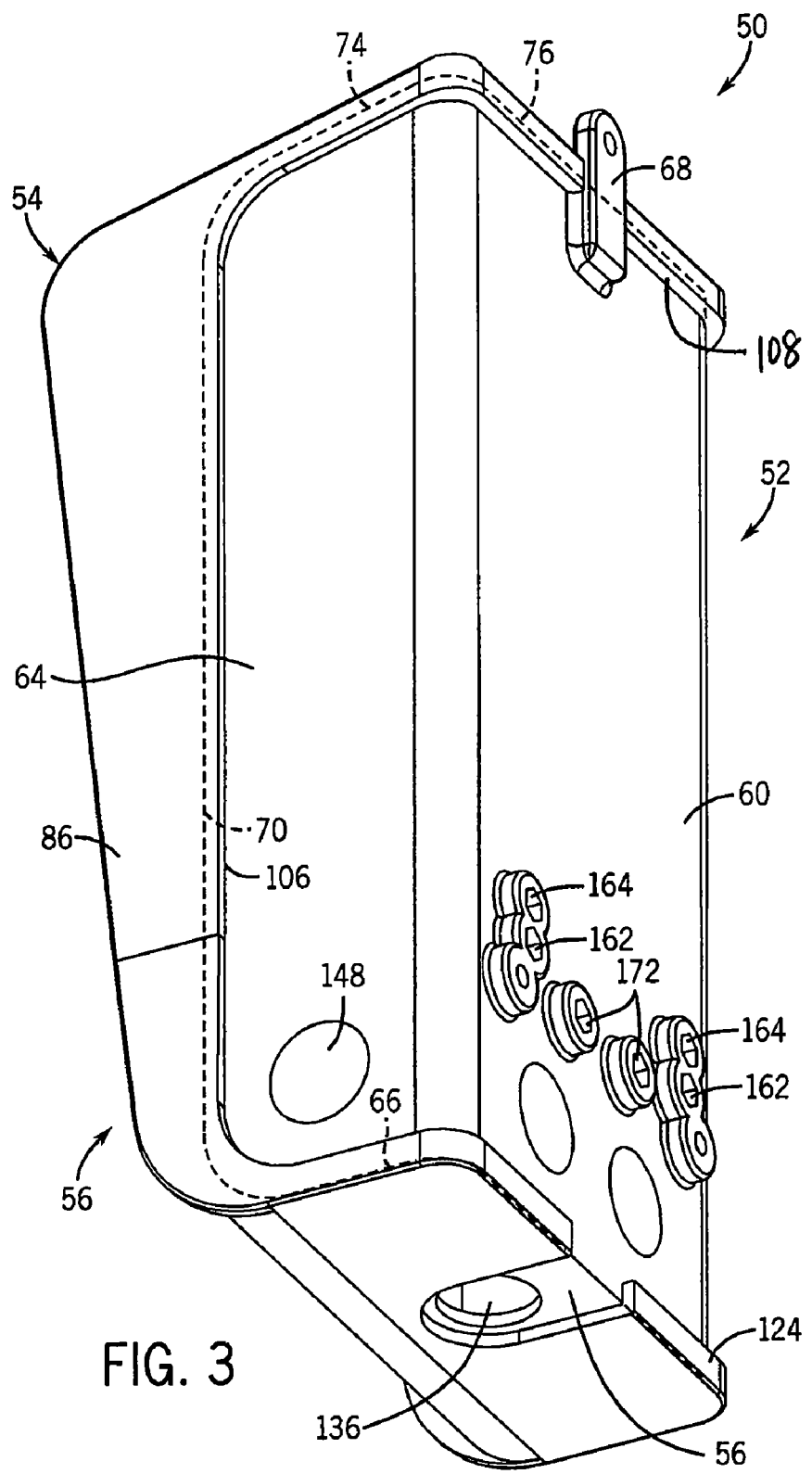
FIG. 3 is a rear isometric view of the power transfer device of FIG. 2.

The peripheral edge of the bottom surface 116 of the second panel 56 has an upturned lip 124 that fits around the lower end of the base 52 when the second panel 56 is mounted to the base 52. More particularly, the lower wall 66 of the base 52 abuts against the underside of the bottom surface 116 when the second panel 56 is mounted to the base. The lip 124 overlaps and wraps around the lower end of the base 52, as best shown in FIG. 3, and the rearwardly extending lip portions of the sidewalls 120, 122 overlap the lower side portions of the base sidewalls 62, 62, to provide a relatively snug fit of the second panel 56 to the base 52. In a manner to be explained, the second panel 56 is attached to the base 52 by a pair of fasteners 126 and the first panel 54 is attached to the base 52 by a pair of fasteners 127.

From the foregoing description of the first and second panels 54, 56, respectively and the base 52, it will be appreciated that during the assembly process, the first panel 54 slides onto an upper portion of the base 52 in a direction along a longitudinal axis defined by base 52, and the second panel similarly slides onto a lower portion of the base 52 in a direction along the longitudinal axis of base 52. It will be appreciated that the construction of the base 52 and, more particularly, the manner in which the first and second panels fit around the base, simplifies the assembly process and avoids exposed seams through which moisture may enter when the power transfer switching mechanism 50 is used in outdoor applications.

While the housing of the transfer switching mechanism 50 has been shown and described as having a two-piece enclosure arrangement consisting of first and second panels 54, 56, respectively, it is understood that other alternative designs are possible and are contemplated as being within the scope of the present invention. In particular, it is contemplated that the housing of the transfer switching mechanism 50 may have a one-piece construction. In such an embodiment, the first panel 54 and the second panel 56 are formed as one piece and are engaged as one with the base 52. The intermediate wall 78 is thus captured between the base 52 and the front wall of the one-piece enclosure. In an embodiment such as this, the intermediate wall 78 does not require the capability of securing two separate pieces to the base 52. Rather, the intermediate wall 78 is provided with one set of passages, and one set of fasteners extend through the passages for engagement with the back wall of the base 52 in order to secure the enclosure arrangement and the intermediate wall 78 to the base 52. It is also contemplated that the enclosure arrangement may be formed of more than two sections, with the sections being secured to the base at an intermediate wall between each adjacent pair of sections.

The power transfer switching mechanism 50 is usable in both indoor and outdoor applications. Accordingly, the power transfer mechanism 50 may be used with cover 58, which is pivotally mounted to the first panel 54. The cover 58 has an upper planar section 126 and a lower curved section 128. A pair of tabs 130 is formed at the upper end of the upper section 126 and are designed to be received in notches 132 formed in the sidewalls 84, 86 of the first panel 54. The notches 132 are shaped such that the cover 58 may pivot about a pivot axis 134, FIG. 7, when the tabs 130 are fully seated in the notches 132. The cover 58 may be rotated or pivoted upward about pivot axis 134 to expose the circuit breakers 98, switches 92, light bar 96, meters 94, and the second panel 56. It will therefore be appreciated that the cover 58 is sized to fit over the first and second panels 54, 56 when pivoted to the closed position. It will be appreciated that the curvature of the lower section 128 is substantially matched to the curvature of the second panel 56, and particularly surface 118, so that the lower section of the cover 58 sits flat against the second panel 56 when the cover is fully lowered.

Figure 7:
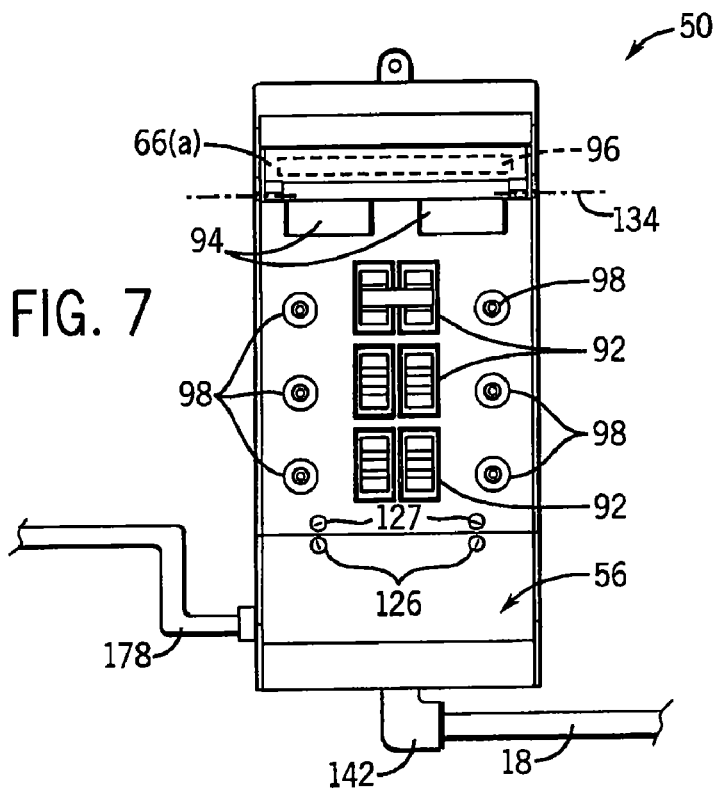
FIG. 7 is a front elevation view of the power transfer device of FIG. 2.
Figure 8:
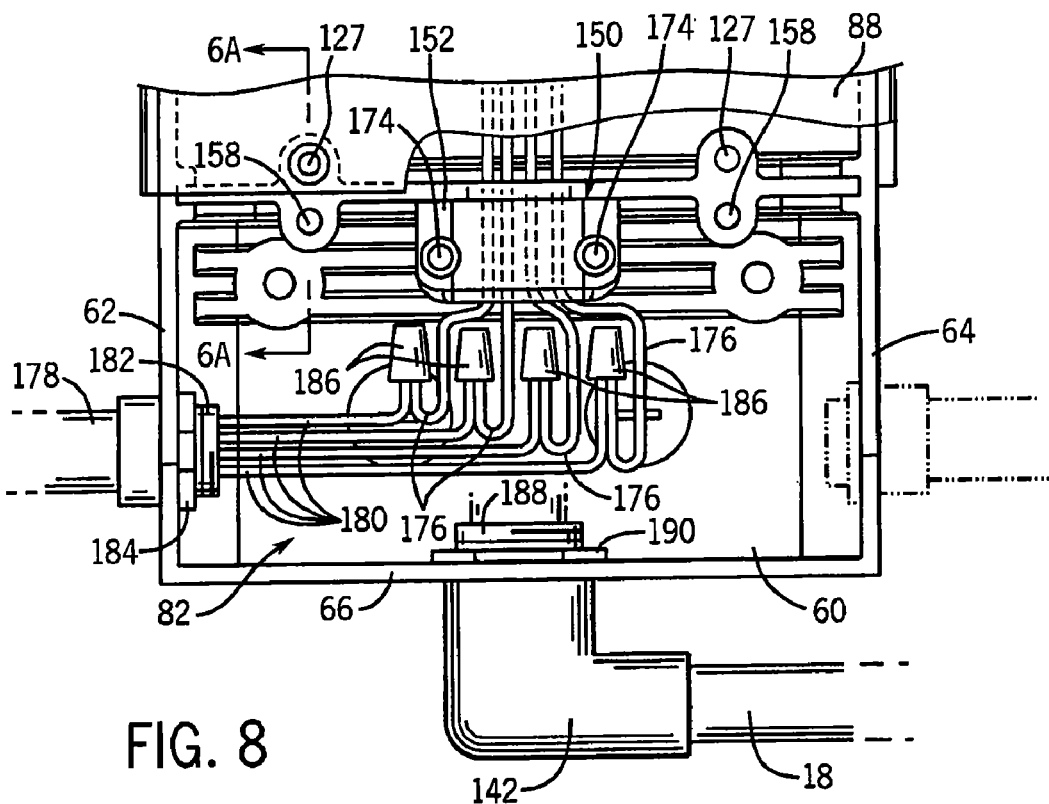
FIG. 8 is a front elevation view of the lower portion of the power transfer device of FIG. 2, shown with the cover and a lower panel removed, and engagement of lead wires with power input wires.

The lower wall 66 of the base 52 has a knockout 136 that allows wires to be routed from the housing 51, as will be described in greater detail below. In one embodiment, the base 52 may have additional knockouts 138, 140 that facilitate the routing of wires to and from the housing 51. In one embodiment, which is best illustrated in FIGS. 7 and 8, an elbow fitting 142 is mounted to the base 52 in a conventional manner via knockout 136. The elbow fitting 142 interfaces with conduit, such as conduit 18, to route wires carried within the conduit 18 to the housing 51. The second panel 56 has a U-shaped cutout 144 that matches the location of knockout 136 and that receives the elbow fitting 142 to allow the second panel 54 to be slid onto or from the base 52 when the elbow fitting 142 is coupled to the base 52. In this regard, the fitting 142 does not need to be disconnected from the base 52 to remove the second panel 56 in order to expose compartment 82.

Figure 4:
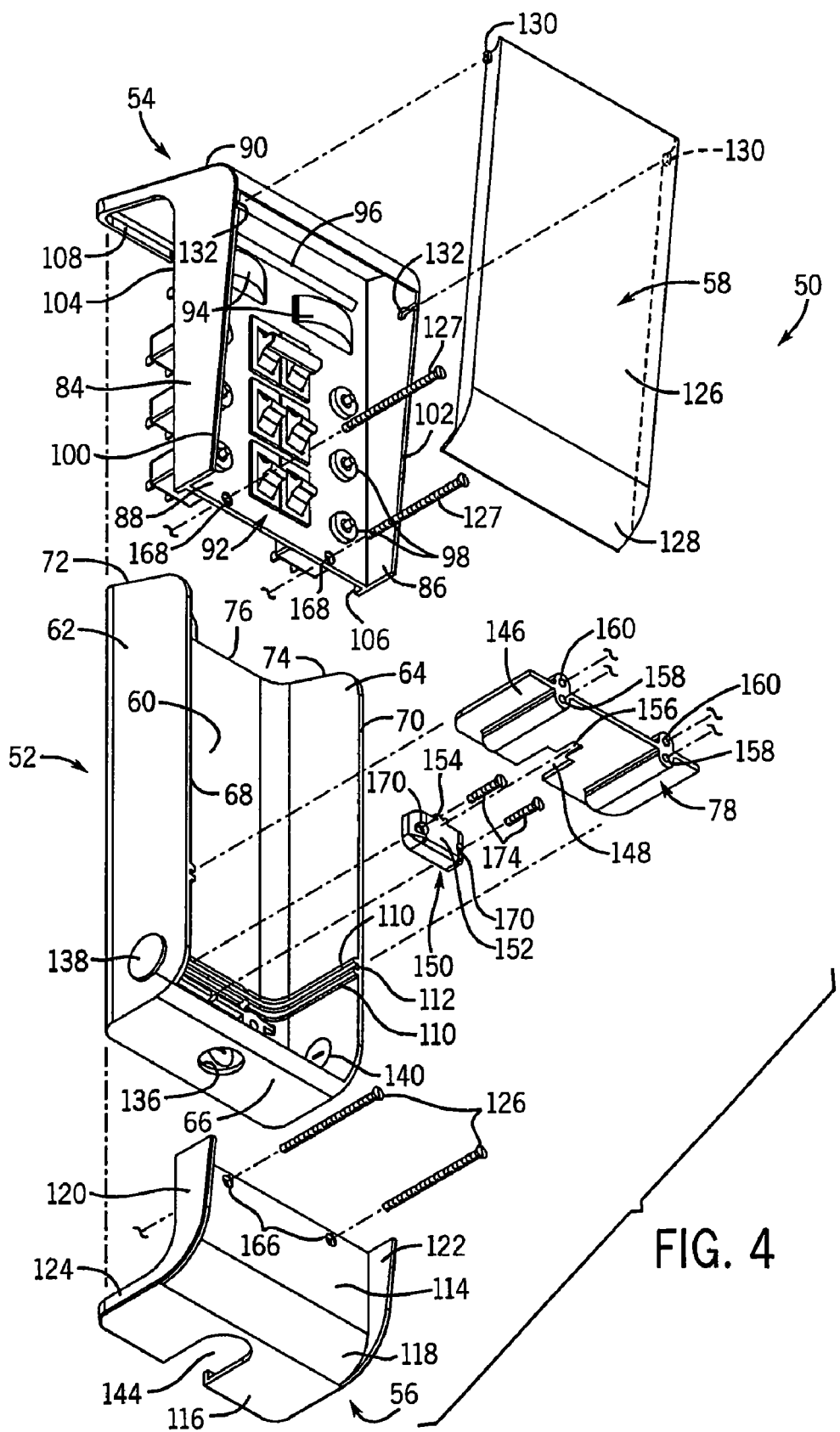
FIG. 4 is an exploded isometric view of the power transfer device of FIG. 2.

Referring particularly now to FIG. 4, the intermediate wall 78 includes a generally planar body 146 having a thickness that allows the body to be slid into the groove 112 formed in the base 52 as described above. An opening or passageway 148 is formed in body 146. The passageway 148 may be generally centered on the back wall 60 and the switches 92. The passageway 148 is designed to enable lead wires to pass from compartment 80 to compartment 82, as will be described further herein.

The power transfer switching mechanism 50 has a strain relief member 150 that includes a clamp 152 that is aligned with the passageway 148 so that wires passing through the passageway 148 may be engaged by the clamp 152 and forced toward the portion of the back wall 60 generally below the intermediate wall 78. The clamp 152 has a guide member 154 that fits within a guide slot 156 formed adjacent the passageway 148 in the body 146 of the wall 78. The guide member 154 and guide slot 156 cooperate to define a desired fixed range of movement for the clamp 152 and to center the clamp 152 about the passageway 148.

The intermediate wall 78 includes two pairs of elongated bores 158 and 160 that extend through bosses formed on the underside and topside of the body 146, respectively. Bores 158 align with nut receivers 162 formed in the backside of wall 60, as shown in FIG. 3. Similarly, bores 160 align with nut receivers 164 also formed in the backside of the wall 60. The elongated bores 158, 160 also align with openings 166, 168 formed in the first and second panels 54, 56, respectively. In this manner, as shown in FIG. 6A, elongated fasteners 126, 127 may be passed through openings 166, 168, elongated bores 158, 160, and threadingly engaged with nuts that are non-rotatably placed in nut receivers 162, 164 to couple the first panel 54, the second panel 56, and the intermediate wall 78 to the base 52.

The clamp 152 of the strain relief member 150 has openings 170 that align with threaded nut receivers 172 formed in the backside of wall 60, as shown in FIG. 3, when the clamp 152 is properly positioned within compartment 82. Threaded fasteners 174 pass through the openings 170 and ultimately threadably engage nuts that are non-rotatably placed in nut receivers 172 to secure the clamp 152 to the base 52.

As described above, the power transfer switching mechanism 50 is constructed to define first and second compartments, which are illustrated as upper and lower compartments 80 and 82 in the figures. Intermediate wall 78 is mounted to base 52 and separates the upper and lower compartments from one another. The upper compartment 80 is closed by first panel 54 that, as described above, carries various electrical components, such as switches 92, meters 94, light bar 96, and circuit breakers 98. The lower compartment 82 is designed to facilitate the connection of wires to these various electrical components. In this regard, the entire housing 51 does not need to be disassembled when making the necessary connections to the electrical components. The wires connected to the electrical components can simply be routed from the upper compartment 80 through passageway 148 formed in the intermediate wall 78 to the lower compartment 82 for connection to various output wires.

Figure 5:
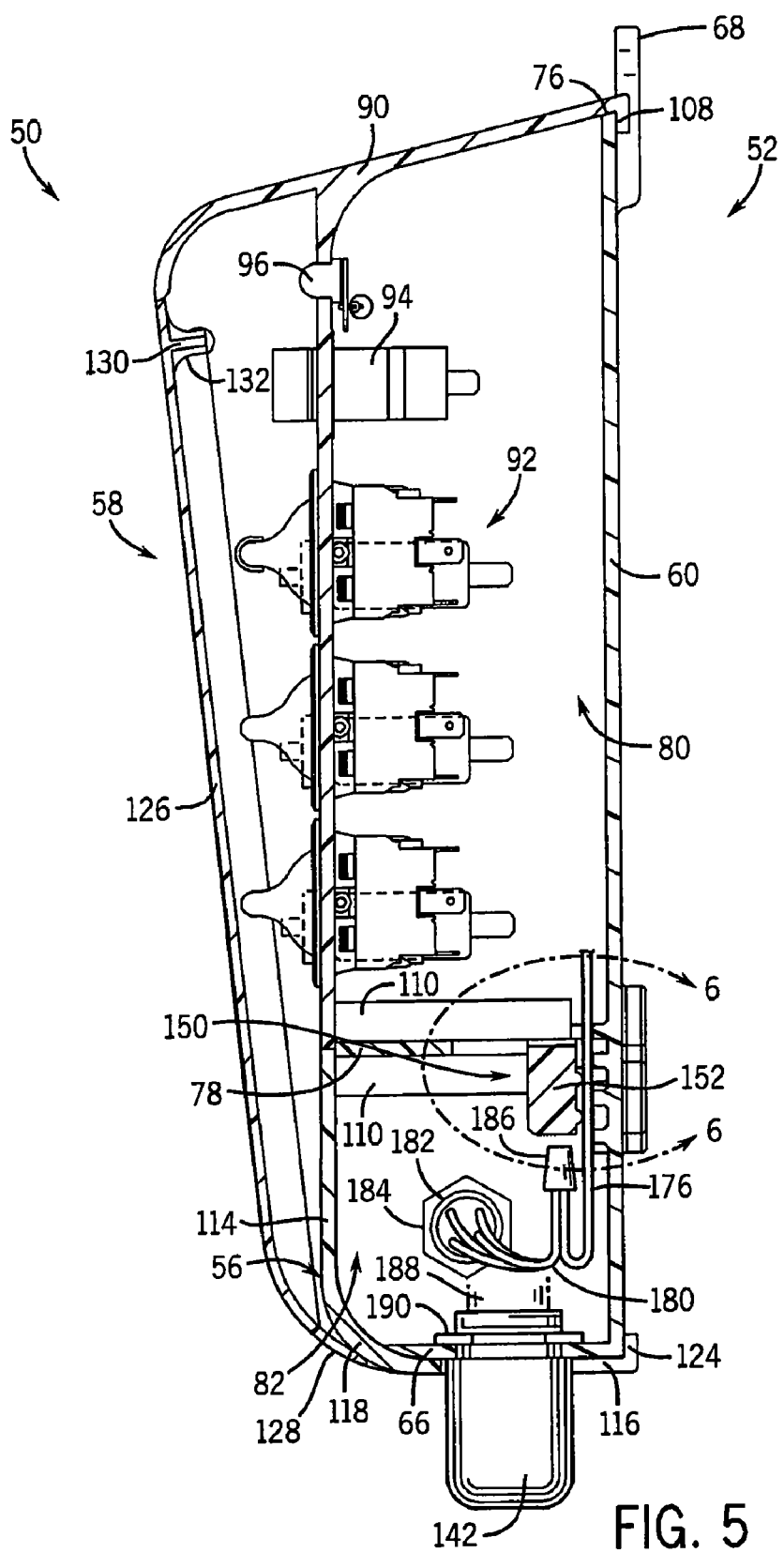
FIG. 5 is a section view of the power transfer device of FIG. 2 taken along line 5-5 of FIG. 2.
Figure 6:
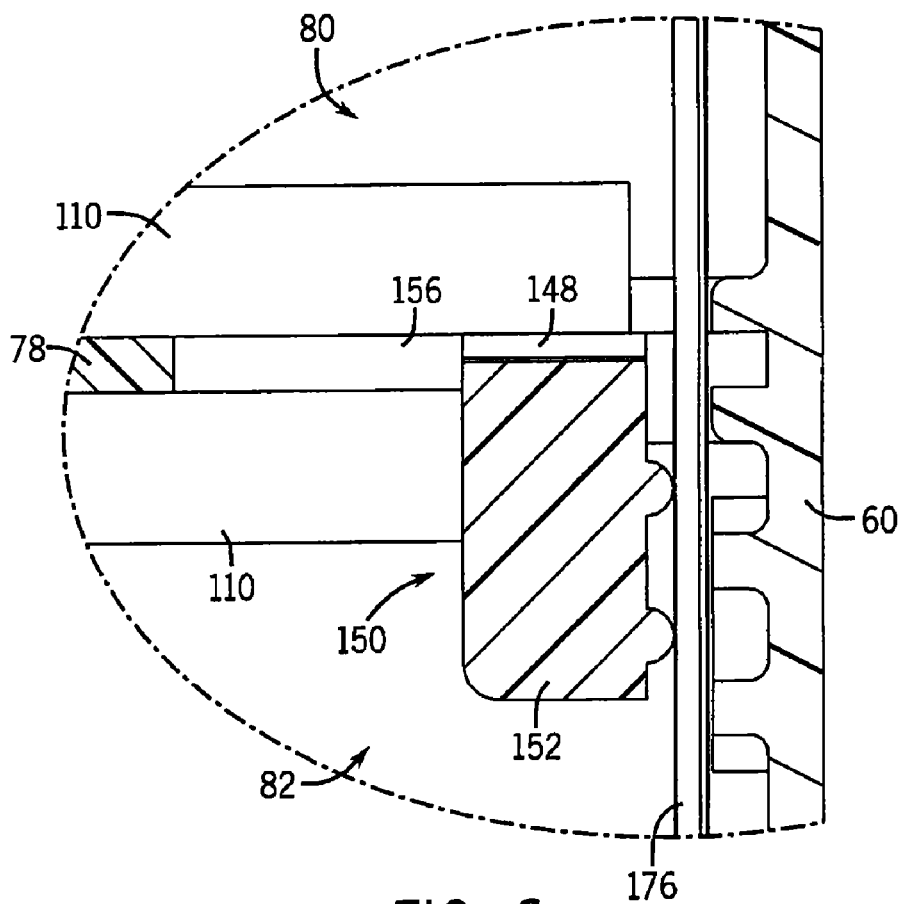
FIG. 6 is an enlarged view, partially in section, of a portion of the power transfer device of FIG. 2, with reference to line 6-6 of FIG. 5.
Figure 6A:
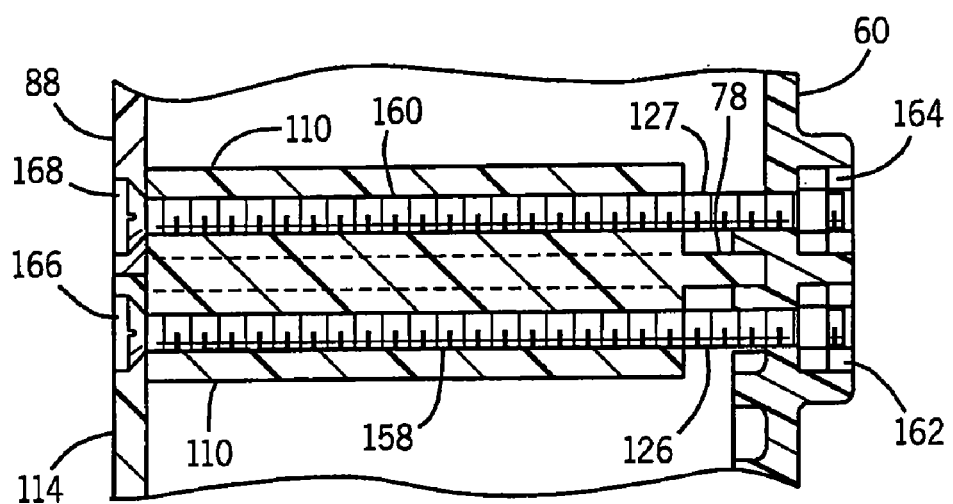
FIG. 6A is a partial section view taken along line 6A-6A of FIG. 2.

In this regard, and with reference to FIGS. 5, 6, and 8, a series of lead wires 176 extend from the upper compartment 80 into the lower compartment 82. Each lead wire 176 defines an upper end extending into upper compartment 80 for interconnection with one of the electrical components secured to first panel 54, and a lower end located within lower compartment 82. The upper ends of two of lead wires 176 may be connected to a pair of bus bars (not shown), and the switches 92 are mounted to each bus bar in a manner as is known. In one embodiment, two lead wires are connected to power input meters 94 which in turn are interconnected with bus bars and switches 92. In addition, two lead wires are connected to the light bar 96 and are then interconnected with the bus bar and switches 92. The remaining two lead wires 176 may consist of a neutral wire connected in upper compartment 80 to a neutral wire extending through conduit 18 to main panel 12, and a ground wire connected in upper compartment 80 to the frame of transfer switch 16 and to a ground wire extending through conduit 18 to main panel 12.

Each lead wire 176 extends through the strain relief member 150, which is mounted adjacent opening 148 formed in intermediate wall 78. The strain relief member 150 securely clamps the lead wires 176 against the back wall 60, so as to fix the length of wires 176 between strain relief member 150 and the upper connection of wires 176. The length of wires 176 between their lower ends and strain relief member 150 forms a "tail" which can be freely moved about within compartment 82 or moved out of compartment 82, with strain relief member 150 functioning to prevent disengagement of the upper ends of wires 176 from the upper connections upon such movement of the lower ends of wires 176. With this arrangement, the lower ends of wires 176 extend into and are accessible from compartment 82. As described above, the strain relief member 150 mounts to the base 52 by threaded fasteners 174 which allow the strain relief member 150 to move with the fasteners 174 until the fasteners 174 are tightened down to lock the strain relief member 150 in place. This allows the strain relief member 150 to be moved away from the back wall 60 and the ends of wires 176 to be pulled between the strain relief member 150 and the back wall 60. Once the desired "tail" length is achieved, the fasteners 174 can be tightened down using a suitable tool to press the strain relief member 150 against the wires 176 to hold the wires 176 against the back wall 60, as illustrated in FIG. 6.

Referring to FIG. 7, a conduit 178 may be mounted to sidewall 62 of base 52. Conduit 178 extends between power transfer mechanism 50 and power inlet box 20, and encloses a series of power input wires 180. Conduit 178 extends through knockout opening 138 formed in the lower portion of sidewall 62 via a conventional nipple 182 and lock nut 184. As can be appreciated, an input wire conduit such as 178 could also be connected through a knock-out opening in sidewall 64 or in a knock-out opening in back wall 60.

Power input wires 180 are connected at one end to power inlet receptacle 26 of inlet box 20. The opposite ends of power input wires 180 extend through the open end of conduit 178 and into compartment 82 of power transfer mechanism 50, where the power input wire ends are adapted for connection to the lower ends of lead wires 176. The end of each power input wire 180 is paired with an appropriate one of lead wires 176, and the paired wire ends are then exposed and connected in a conventional manner, such as by twisting together and securing the connection by use of conventional twist-on connectors 186, in a manner as is known. This arrangement provides a direct, hard-wired, non-plug type connection between power inlet box 20 and power transfer mechanism 50, without the need for a plug-type connector. In addition, this arrangement eliminates the cost and space required by the terminal arrangement illustrated in U.S. Pat. No. 5,895,981, thus reducing the overall cost of manufacture of power transfer mechanism 50.

Power transfer mechanism 50 can be installed by an electrical contractor or a do-it-yourself homeowner, by first mounting power transfer mechanism 50 in a satisfactory location adjacent main panel 12. Cover 58 of power transfer mechanism 50 is then raised or removed and the second panel 56 is then removed so as to expose lower compartment 82 and the ends of lead wires 176. Conduit 178 is then installed in a known manner, and the ends of power input wires 180 are then pulled through the passage of conduit 178 so as to extend into compartment 82. Lead wires 176 and power input wires 180 can then be cut to length as necessary, and the ends of lead wires 176 and power input wires 180 can be drawn out of compartment 82 to enable the installer to make the connections between lead wires 176 and power input wires 180. Once connected using connectors 186, lead wires 176, power input wires 180 and connectors 186 are then placed into compartment 82 and second panel 56 is installed, so as to enclose compartment 82 and lead wires 176, power input wires 180 and connectors 186 contained therein. This enables establishment of a direct electrical connection between remote power inlet box 20 and power transfer mechanism 50, without the need for connecting a flexible cord to a power input receptacle as in the prior art. In this manner, the only step in operation of power transfer mechanism 50 to transfer power from generator 10 to main panel 12 is to place switches 92 in the appropriate position, so as to transfer power to main panel 12 as desired in response to operation of generator 10. The cover 58 may then be pivoted downward or mounted into place.

In a known manner, output wires from switches 92 extend through compartment 82 and are connected to elbow fitting 142 secured to lower wall 66, for routing through conduit 18 to main panel 12.

Figure 9:
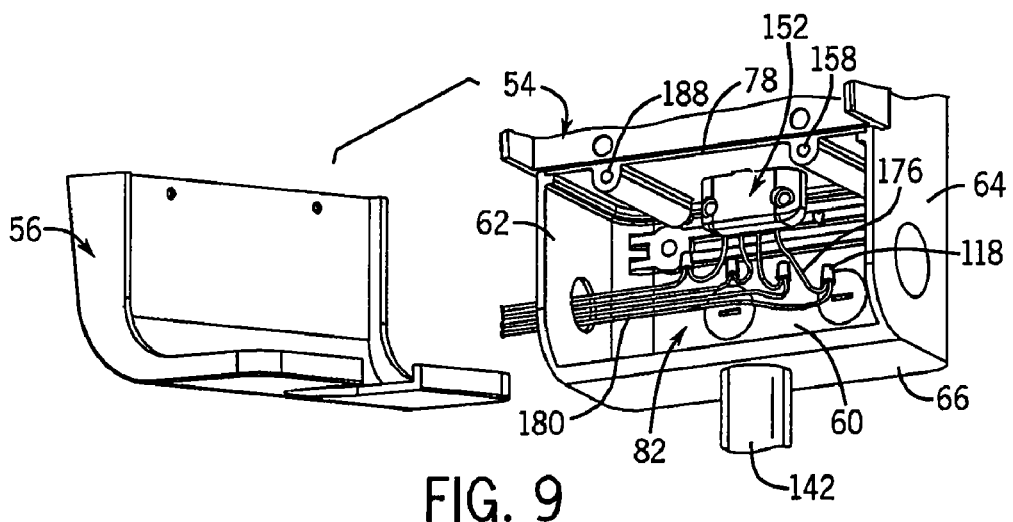
FIG. 9 is a partial exploded isometric view of the lower portion of the power transfer device of FIG. 2, illustrating the lower panel adapted for engagement with the power transfer device housing over the lower compartment.

FIG. 9 schematically illustrates the lower end of power transfer mechanism 50. As shown, when the second panel 56 is removed, lower compartment 82 is exposed so as to enable power input wires 176 to be connected to lead wires 180 using connectors 186. As explained previously, once the connections between lead wires 176 and power input wires 180 are made using connectors 186, input wires 180 are placed into compartment 82 along with lead wires 176 and connectors 186. Second panel 56 is then secured over the outwardly facing access opening of lower compartment 82, so as to close lower compartment 82 and to prevent access to the connections between lead wires 176 and power input wires 180. The U-shaped cutout 144 in the second panel 56 allows the second panel 56 to be placed over the lower compartment 82 and receive the elbow fitting 142. The elbow fitting 142 connects to the base 52 via a conventional nipple 188 and lock nut 190, which is illustrated in FIG. 8.

FIG. 9 illustrates conduit 178, nipple 182 and lock nut 184 removed, and input wires 180 extending through the opening formed by a knock-out section in sidewall 62. It is understood, however, that power input wires 180 are normally housed within a conduit or other sheath when located externally of the housing of power transfer mechanism 50.

Figure 10:
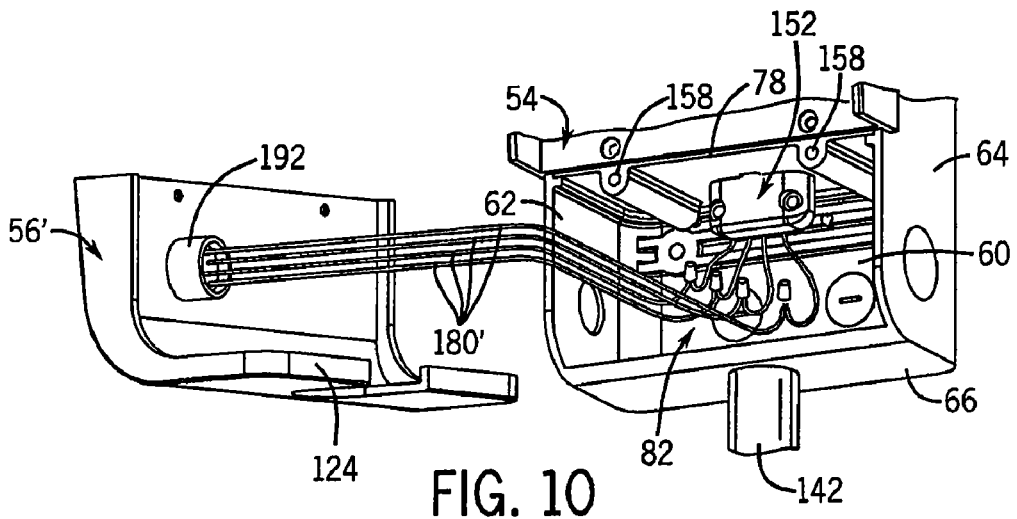
FIG. 10 is a view similar to FIG. 9, showing an alternative embodiment in which a power input receptacle is mounted to the lower panel and a set of power input or connection wires are interposed between the power input receptacle and the lead wires.

FIG. 10 illustrates an alternative embodiment, in which a power input socket or receptacle 192 is mounted to the front wall of second panel 56'. Receptacle 192 may be constructed as shown and described in U.S. Pat. No. 6,293,821 issued Sep. 25, 2001, the disclosure of which is hereby incorporated by reference. In this version, power input wires 180' are mounted to terminals or other electrical connections associated with receptacle 192, extending rearwardly therefrom. The ends of power input wires 180' are connected to the ends of lead wires 176 in the same manner as described previously with respect to connection of power input wires 180 to lead wires 176. Once the connections between lead wires 176 and power input wires 180' are made using connectors 186, lead wires 176, power input wires 180' and connectors 186 are placed into lower compartment 82. Second panel 56', to which receptacle 192 is mounted, is then secured to the power transfer mechanism 50 in the same manner as described previously, to close lower compartment 82. It will be appreciated that the cover 58 may modified to accommodate a plug engaged with receptacle 192.

Figure 11:
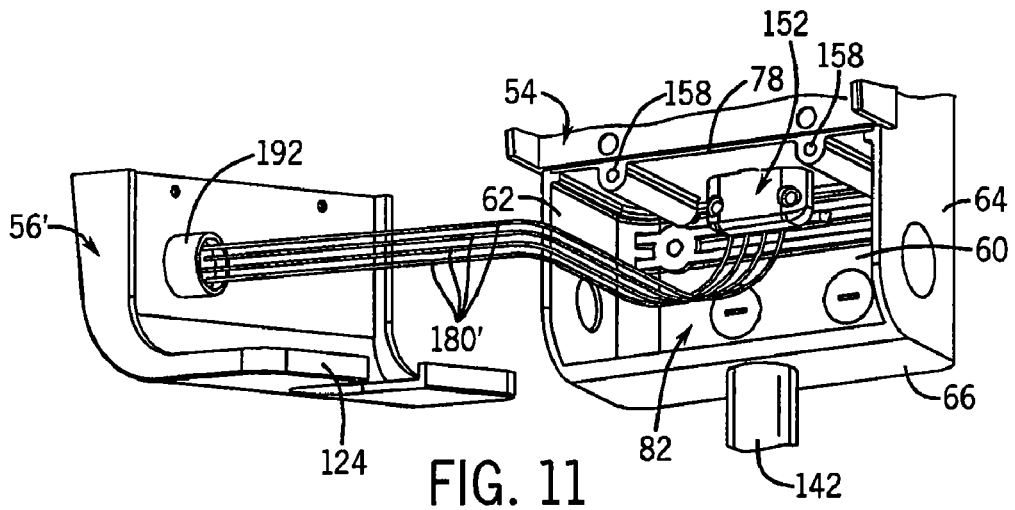
FIG. 11 is a view similar to FIG. 10, showing an alternative embodiment in which the lead wire ends are engaged directly with the power input receptacle.

FIG. 11 illustrates an alternative arrangement utilizing second panel 56' and power input receptacle 192 mounted thereto. In this version, lead wires 176 have a length sufficient to enable lead wires 176 to be manipulated so as to provide connection of the ends of lead wires 176 to the terminals or connectors associated with power input receptacle 192. Once the ends of lead wires 176 are engaged with power input receptacle 192, the length of lead wires 176 between strain relief member 150 and the connection to receptacle 192 is placed into lower compartment 82 and panel 56' is then mounted in the same manner as described previously to enclose and prevent assess to lower compartment 82.

FIGS. 9 through 11 illustrate that the connection arrangement of the present invention may be used to directly connect power transfer mechanism 50 with power inlet box 20. Alternatively, the present invention may be used to connect a power input receptacle to power transfer mechanism 50, for use in a plug-type system as illustrated in FIG. 1.

It will be appreciated that the present invention provides a power transfer mechanism 50 that can be manufactured more efficiently than conventional power transfer mechanisms. More particularly, and with reference to FIG. 4, the power transfer mechanism 50 is constructed such that switches 92, circuit breakers 98, power meters 94, and the light bar 96 are mounted to upper panel 54 to form a fully assembled and integrated structure that is mounted as a subassembly to the base 52. Before the upper panel 54 is secured to the base 52, the lead wires are connected to the breakers 98, switches 92, power meters 94, and light bar 96, and then the free ends of the wire leads are passed through the opening 148 formed in the intermediate wall 78. The intermediate wall 78 is then advanced into groove 112 and the upper panel 56 is then engaged with the base 52 using fasteners 127 as described above, which also results in fastening of the wall 78 to the base 52. The second panel 56 is then secured over the lower compartment 82 using fasteners 126. As noted above, the second panel 56 is removable to expose the lower compartment 82 and the lead wires 176 extending therein. Such a construction allows an installer to make the connection between the power input wires 180 and the lead wires 176, as described above. After the electrical connections have been made, the second panel 56 is again mounted to the base 52 using fasteners 126. After the second panel 56 is placed over the opening to the lower compartment 82 and secured to the base 52, the cover 58 may be installed by inserting the tabs 130 into the notches 132 formed in the upper panel 54. Once the tabs 130 are fully seated in the notches 132, the cover 58 may be pivoted or rotated downward to cover the upper and lower panels 54, 56.

As described above, the power transfer mechanism 50 includes a set of lights or light bar 96 that illuminates the upper panel 54. In one embodiment, the light bar 96 is fed electrical power from the auxiliary power source and thus illuminates the upper panel 54 when the auxiliary power source is supplying power to the power transfer mechanism 50. In another embodiment, a battery (not shown) may provide electrical power to the light bar 96 when utility power is not providing electrical power to the power transfer mechanism. It is also contemplated that the light bar 96 could be supplied with utility power to provide illumination of the upper panel 54 when utility power is providing electrical power to the power transfer mechanism 50. In one embodiment, the light bar 96 has a set of light emitting diodes, but other types of lighting elements could be used.

In one embodiment, the base 52, intermediate wall 78, upper and lower panels 54, 56, and the cover 58 are made of rust-resistant or rust-free material, e.g., plastic.

Various alternatives and embodiments are contemplated as being within the scope of the following claims particularly pointing out and distinctly claiming the subject matter regarded as the invention.

The invention claimed is:

1. A power transfer arrangement comprising:
   a base member having a back wall defining first and second ends;

an intermediate wall releasably engaged with the base member at a location between the first and second ends of the back wall;

an enclosure arrangement engaged with the base member and with the intermediate wall, wherein the enclosure arrangement cooperates with the base member to define an interior, and wherein the intermediate wall is configured to separate the interior into a first interior section and a second interior section; and power transfer switching components carried by the enclosure arrangement.

2. The power transfer arrangement of claim 1 wherein the intermediate wall is releasably engaged with the base member via a channel formed along an interior surface of the base member, and wherein the intermediate wall is slidably seated in the channel.

3. The power transfer arrangement of claim 2 wherein the base includes a receiver and the intermediate wall defines a passage aligned with the receiver, and further comprising at least one fastener extending through the enclosure arrangement and the passage for engagement with the receiver for securing the enclosure arrangement and the intermediate wall to the base member.

4. The power transfer arrangement of claim 1 wherein one or more wires extend from the power transfer switching components through an opening in the intermediate wall, and further comprising a strain relief member movably mounted to the intermediate wall for clamping the one or more wires against the back wall.

5. The power transfer arrangement of claim 4 wherein the enclosure arrangement comprises first and second panels, wherein the first panel overlies and defines in part the first section of the housing interior and the second panel overlies and defines in part the second section of the housing interior.

6. The power transfer arrangement of claim 5 wherein the each of the first and second panels is secured at least in part to the base member via one or more fasteners that extend through the intermediate member into engagement with the base member.

7. The power transfer arrangement of claim 6 wherein the power transfer switching components are secured to the first panel, and wherein one or more wires from the power transfer switching components extend through an opening in the intermediate wall from the first section of the interior to the second section of the interior.

8. The power transfer arrangement of claim 1 further comprising a cover removably mounted to the enclosure arrangement to selectively permit and prevent access to the power transfer switching components.

9. The power transfer arrangement of claim 8 wherein the cover is removable from and mountable to the enclosure arrangement in a tool-free manner.

10. The power transfer arrangement of claim 8 wherein the housing, the intermediate wall and the enclosure arrangement are formed of rust-resistant material.

11. The power transfer arrangement of claim 10 wherein the rust-resistant material comprises a plastic material.

12. A transfer switch arrangement comprising:

a base having a first section and a second section;

an intermediate wall removably engaged with the base and defining an end of the first section and an end of the second section;

an enclosure arrangement including power transfer switching components, wherein the enclosure arrangement cooperates with the first section of the back wall and the intermediate wall to define a first compartment and cooperates with the second section of the back wall and the intermediate wall to define a second compartment.

13. The transfer switch arrangement of claim 12 wherein the enclosure arrangement comprises first and second panels, wherein the first panel overlies and defines in part the first compartment and the second panel overlies and defines in part the second compartment.

14. The transfer switch arrangement of claim 12 wherein each of the first and second panels is secured at least in part to the base via one or more fasteners that extend through the intermediate wall into engagement with the base.

15. The transfer switch arrangement of claim 12 wherein the intermediate wall is removably engaged with the base via a channel associated with the base into which the intermediate wall is slidably received.

16. The transfer switch arrangement of claim 15 wherein the enclosure arrangement comprises first and second panels, wherein the first panel overlies and defines in part the first compartment and the second panel overlies and defines in part the second compartment, and wherein each of the first and second panels includes an end wall spaced from the intermediate wall and defining respective ends of the first and second compartments.

17. The transfer switch arrangement of claim 12 wherein the base, the intermediate wall, and the enclosure arrangement are formed of a plastic material.

* * * * *